Sept. 20, 1927.

T. W. MARTIN

CARPENTER'S TAPE

Filed Aug. 20, 1926

Inventor
T. W. Martin
By Reue/f Eaton
Attorney

Sept. 20, 1927.
T. W. MARTIN
CARPENTER'S TAPE
Filed Aug. 20, 1926          2 Sheets-Sheet 2
1,643,166
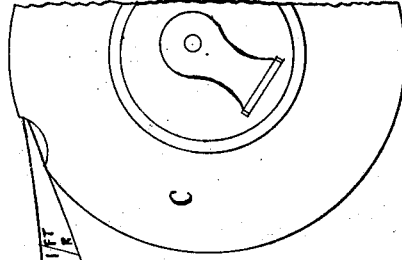
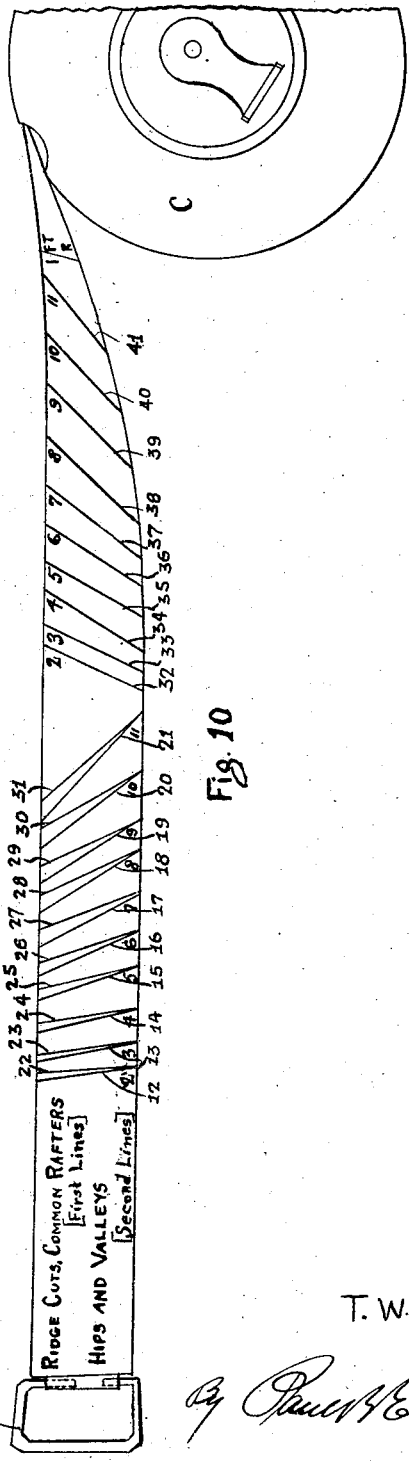
Fig. 7.   Fig. 8.   Fig. 9.   Fig. 10

Patented Sept. 20, 1927.

1,643,166

UNITED STATES PATENT OFFICE.

TOBIAS W. MARTIN, OF CHARLOTTE, NORTH CAROLINA.

CARPENTER'S TAPE.

Application filed August 20, 1926. Serial No. 130,471.

My invention relates to carpenters' tapes, and more especially to the ordinary flexible steel tape now in common use among carpenters, which rolls up into a case when not in use.

An object of my invention is to provide a carpenter's tape on which will appear in permanent form much necessary data for carpenters in the building of houses, which will enable them to see at a glance the information they desire without the necessity of tedious calculations.

Another object of my invention is to provide a carpenter's tape on which will appear tables giving the length of rafters, jacks, valleys, and ridge cuts for the roof of a house of any ordinary pitch, and also giving the angles at which the ends of these various parts must be sawed.

I attain these objects of invention by using the ordinary tape having the conventional foot and inch markings thereon on one side, together with my information and calculations appearing on the other side.

Some of the objects of invention having been stated, other objects will appear as the description proceeds.

A brief description of the drawings follows, in which—

Figure 1 shows the first foot length of an ordinary tape showing the conventional notations of feet and inches thereon;

Figure 2 is a view of the opposite side of the tape shown in Figure 1, bearing a part of my invention;

Figure 3 is a view of the second foot measure of my tape bearing an additional part of my invention;

Figure 4 is a view of the third foot measure of my tape;

Figure 5 is a view of the fourth foot measure of my tape;

Figure 6 is a view of the seventeenth foot measure of my tape;

Figure 7 is an additional portion of my tape showing tabulations for additional lengths of the various parts of the roof structure of a house when the width of the house is in odd feet or odd feet and inches;

Figure 8 is a like view showing the additional length of parts when the distance across the house is exactly any odd number of feet;

Figure 9 is a like view showing the additional length of parts when the distance across the house is an odd number of feet plus six inches;

Figure 10 is a side elevation of a tape with the first foot unrolled and showing a part of my invention thereon.

A brief description of the drawings having been given, a detailed description of the drawings will now follow in which like reference characters indicate corresponding parts throughout the drawings.

The numeral 10 indicates an ordinary tape with the conventional markings thereon, and having the conventional link 11 in the end thereof. On the opposite side of the tape as shown in Figure 1 all of my information appears. On the first foot measure as indicated in Figure 2 I have markings indicated by the numerals 12, 13, 14, 15, 16, 17, 18, 19, 20 and 21 which show the angles at which the ends of ridge cuts and common rafters must be cut for all rises per foot from two inches to eleven inches. In close proximity to these markings are the lines indicated by the numerals 22, 23, 24, 25, 26, 27, 28, 29, 30 and 31 which show the angles at which the ends of the hips and valleys must be cut for all rises from two inches to eleven inches.

Slightly further advanced in the first foot measure are the markings 32, 33, 34, 35, 36, 37, 38, 39, 40 and 41 which shows the side cuts of jacks.

Beginning in the second foot measure of the tape and immediately on the opposite side of the inch markings on the conventional side of the tape are the tables which give at a glance the length of the different parts of the roof structure. Let us suppose that the house to be built was two feet wide from plate to plate, and that the pitch of the roof was a two inch rise to the foot, then the numbers appearing in association with the two inch line in the second foot measure, indicated by the numeral 50 would give the length of the rafters for this building to be one foot and .16 inches, the hips and valleys would be 1 foot, 5.09 inches, and the jacks would be indicated as being 2 feet and .33 inches shorter than the common rafters, which would mean in this case of such a small house that there would be no jacks.

Now let us suppose that the house to be built was 32 feet across from plate to plate, thus meaning that the distance from the center of the house to the plate would be 16 feet, and let us suppose that it had a five inch rise to the foot, then by consulting Figure 6 we would see that at the point indicated by the numeral 51 that the length of the rafters would be 17 feet and 4 inches, that the hips and valleys would be 23 feet and 7.04 inches, and that the jacks having a 2 foot center would be 2 feet and 2 inches shorter than the common rafters.

In Figure 4 I have shown the length of the jacks having a 1 foot and four inch center, as indicated by the lower line in said figure.

These tabulations as appearing in the first six figures in the drawings run all the way along the tape, and at the inside end of the tape I have provided the matter shown in Figures 7, 8 and 9. In case a building was 24 feet and 6 inches wide, then the length of the parts would be ascertained by getting the length given at the point on the tape between the 12 foot and the 13 foot mark on the tape, and adding to these lengths the data appearing in Figure 7, as the distance between the center of the building and one of the outside plates would be 12 feet and 3 inches.

Figure 8 would be consulted in the manner just described when the building was 25 feet wide, thus making the half distance 12 feet and 6 inches, and where the building was 25 feet and 6 inches wide Figure 9 would be consulted in connection with the 13th foot measure on the rule.

The angles for the ridge cuts and common rafters as appearing in Figure 2 and obtained by placing the ordinary square on the piece of timber with the 12 inch mark at the end of the piece of timber, and on the other arm of the square the inch mark at which pitch the roof rises is placed at the edge of the timber, and thus the angle is obtained. But I have placed this angle on the tape, so that calculations are not necessary.

For the determination of the angles of the hips and valleys the above operation is repeated with the exception that the 17 inch mark is placed at the end of the piece of timber instead of the 12 inch mark above described for common rafters.

In each of the figures the numeral 60 indicates the length of the parts where there is a 2 inch rise per foot in the roof, the numeral 61 indicates the length of the parts where there is a three-inch rise, the numeral 62 for the 4 inch rise, 63 for a 5 inch rise, 64 for a 6 inch rise, 65 for a 7 inch rise, 66 for an 8 inch rise, 67 for a 9 inch rise, 68 for a 10 inch rise, and 69 for a 11 inch rise.

I am aware that heretofore there have been squares having data similar to mine for one foot, thus making it necessary to multiply the information contained on the square by the distance from the plate to the center of the building, but I believe that I am the first one to have a linear measure giving the lengths of the various parts of a roof structure on the measure for any ordinary length of roof, thus eliminating the necessity of using multiplication at all.

It is a well known fact that many carpenters are not capable of multiplying, and that even in the case of their being able to multiply, that mistakes will occur. In my device there is no chance of a mistake being made, as all the carpenter has to do to determine the length of the various parts of the roof structure is to determine the distance from the plate to the center of the building and then pull out the tape from its casing to this length as indicated on the tape, and there will appear all the information at a glance without the necessity of any calculations, except some simple addition or subtraction in some cases, multiplication being entirely eliminated in building roof structures by the use of my device.

Having fully described my invention, what I desire to secure and protect by Letters Patent of the United States is as follows:

I claim:

1. A carpenter's tape having conventional foot and inch markings thereon on one side thereof, the foot markings representing the horizontal run of roof structures, and the inch markings representing rise of roof per foot of run, and data appearing on the face of the tape opposite each inch marking giving the length of the various parts of a roof structure.

2. A tape measure having located thereon, foot markings indicating one-half the width of a house, inch markings immediately following each foot marking, said inch markings indicating the rise in inches per foot for the roof structure, and data at the inch markings giving the length of the various parts of a roof structure.

3. A carpenter's tape having foot sections marked thereon, the first foot section having lines thereon giving the angle at which the ends of the framework of a roof structure should be cut, with the inch rise per foot marked at each angle marking, and the succeeding foot sections having data at each inch marking giving the actual length of the framework of a roof structure having a horizontal width equal to the foot marking immediately preceding the inch markings.

4. A tape having data thereon, whereby when the tape is unrolled to the foot marking corresponding to the horizontal width of a roof, the actual length of the parts of the roof structure will be given opposite the inch markings, the said inch markings representing the rise of the roof for each horizontal foot thereof.

In testimony whereof I have affixed my signature.

TOBIAS W. MARTIN.